US007314188B2

(12) United States Patent
Watson et al.

(10) Patent No.: US 7,314,188 B2
(45) Date of Patent: Jan. 1, 2008

(54) WAREWASH MACHINE ARM AND NOZZLE CONSTRUCTION WITH SET SPRAY PATTERN

(75) Inventors: Michael Watson, Beavercreek, OH (US); Kui-Chiu Kwok, Gurnee, IL (US); Anatoly Gosis, Palatine, IL (US); Robert G. Kobetsky, Chicago, IL (US)

(73) Assignee: Premark FEG L.L.C., Wilmington, DE (US)

( * ) Notice: Subject to any disclaimer, the term of this patent is extended or adjusted under 35 U.S.C. 154(b) by 171 days.

(21) Appl. No.: 11/005,985

(22) Filed: Dec. 7, 2004

(65) Prior Publication Data

US 2005/0077399 A1 Apr. 14, 2005

Related U.S. Application Data

(63) Continuation-in-part of application No. 10/837,362, filed on May 1, 2004.

(60) Provisional application No. 60/478,380, filed on Jun. 13, 2003.

(51) Int. Cl.
*B05B 1/14* (2006.01)
*A01G 25/02* (2006.01)
*B05B 1/20* (2006.01)

(52) U.S. Cl. ................. 239/568; 239/222.21; 239/266; 239/391; 239/550

(58) Field of Classification Search ................ 239/550, 239/556, 566, 568, 553, 567, 390, 391, 279, 239/280, 11, 66, 214.15, 222, 266, 222.11, 239/222.21, 273, 282
See application file for complete search history.

(56) References Cited

U.S. PATENT DOCUMENTS 3,568,935 A * 3/1971 Hoffman ..................... 239/568
3,695,283 A 10/1972 Ringwall
4,107,990 A 8/1978 Ringwall
4,157,161 A 6/1979 Bauer
4,257,559 A * 3/1981 Noren ......................... 239/283
4,325,235 A 4/1982 Bauer et al.

(Continued)

FOREIGN PATENT DOCUMENTS

DE 1503901 7/1969

(Continued)

OTHER PUBLICATIONS

Stero, SD-2RA, Door Type-20" Racks, Apr. 1984, 4 pages.

(Continued)

*Primary Examiner*—Kevin Shaver
*Assistant Examiner*—James S. Hogan
(74) *Attorney, Agent, or Firm*—Thompson Hine LLP

(57) ABSTRACT

A warewash machine includes a housing including an area for receiving wares to be washed and a liquid dispensing arm removably positioned within the housing, the liquid dispensing arm including a nozzle receiving opening. Removably positioned in the nozzle opening is a nozzle that is configured to output liquid in a specific output pattern. The nozzle receiving opening and the nozzle are cooperatively shaped and configured such that when the nozzle is inserted in the nozzle receiving opening the nozzle is automatically positioned such that an orientation of the specific output pattern relative to the area is automatically set to a specific orientation.

15 Claims, 8 Drawing Sheets

U.S. PATENT DOCUMENTS

| | | | | |
|---|---|---|---|---|
| 4,463,904 | A | 8/1984 | Bray, Jr. | |
| 4,561,904 | A | 12/1985 | Eberhardt, Jr. | |
| 4,596,364 | A * | 6/1986 | Bauer | 239/589.1 |
| 5,197,673 | A * | 3/1993 | Sullivan | 239/102.1 |
| 5,906,317 | A | 5/1999 | Srinath | |
| 5,967,418 | A * | 10/1999 | MacDonald et al. | 239/391 |
| 6,110,292 | A | 8/2000 | Jewett et al. | |
| 6,315,221 | B1 * | 11/2001 | Goenka et al. | 239/589 |
| 6,467,476 | B1 | 10/2002 | Ivri et al. | |
| 6,550,607 | B1 | 4/2003 | Watson et al. | |
| 6,736,340 | B1 * | 5/2004 | Wang | 239/583 |
| 6,739,526 | B2 * | 5/2004 | Wlodarczyk | 239/551 |
| 7,083,121 | B2 * | 8/2006 | Huffman | 239/398 |

FOREIGN PATENT DOCUMENTS

| | | |
|---|---|---|
| DE | 1920575 | 11/1970 |
| DE | 1920575 B * | 11/1970 |
| DE | 2534261 | 4/1976 |
| DE | 4230054 A1 * | 3/1994 |
| DE | 19544985 | 6/1996 |

OTHER PUBLICATIONS

Stero, Instruction & Parts Manual, Door, Stero Dishwashing Machines, Feb. 28, 1997, 44 pages.

"Experimental and Computational Visualization and Frequency Measurements of the Jet Oscillation Inside a Fluidic Oscillator," O. Uzol, C. Camci, 4th International Symposium on Particle Image Velocimetry, Göttingen, Germany, Sep. 17-19, 2001, PIV'01 Paper 1029, 9 pages.

Hobart Catalog of Replacment Parts Model C44A, C44AW, & C54A Series Dishwashers, Form 17820 Rev. D (May 2001), 64 pages.

Hobart C-Line A & AW Dishwashers Instructions, Form 17791 Rev. M (Apr. 2003), 28 pages.

* cited by examiner

WAREWASH MACHINE ARM AND NOZZLE CONSTRUCTION WITH SET SPRAY PATTERN

CROSS REFERENCE TO RELATED APPLICATION

This application is a continuation in part of U.S. application Ser. No. 10/837,362, filed May 1, 2004, which claims the benefit of U.S. provisional application Ser. No. 60/478,380, filed Jun. 13, 2003.

TECHNICAL FIELD

The present application relates generally to machines used to wash kitchen wares such as dishes, glasses, utensils and pots and pans, and more particularly to a ware wash machine that makes effective use of one or more fluidic oscillator nozzles (or other variable stream orientation nozzles as defined below) in one or more areas of the machine.

BACKGROUND

It is known to provide varying types of ware wash machines. Two of the most common types of commercial machines are the single rack-type box unit and the conveyor-type unit. The former may include a single chamber into which a rack of soiled ware can be placed. Within the chamber, the entire cleaning process, typically including washing, rinsing and drying is performed on the rack. Multiple racks must be washed sequentially, with each rack being completely cleaned before the next can be operated upon. A conveyor-type machine, on the other hand, includes a conveyor for carrying individual items or entire racks of ware through multiple stations within the machine housing. A different operation may be carried out at each station, such as washing, rinsing, or drying. Thus, multiple items or racks of ware can be placed on the conveyor and moved continuously through the machine so that, for example, while one item or rack is being rinsed, a preceding item or rack can be dried. One difficulty encountered in the construction of such machines, regardless of type, is balancing effective washing and rinsing with the goal of limiting the amount of liquid, detergents, rinse agents and sanitizers used for such washing and rinsing.

SUMMARY

In an aspect, a warewash machine includes a housing including an area for receiving wares to be washed and a liquid dispensing arm removably positioned within the housing, the liquid dispensing arm including a nozzle receiving opening. Removably positioned in the nozzle opening is a nozzle that is configured to output liquid in a specific output pattern. The nozzle receiving opening and the nozzle are cooperatively shaped and configured such that when the nozzle is inserted in the nozzle receiving opening the nozzle is automatically positioned such that an orientation of the specific output pattern relative to the area is automatically set to a specific orientation.

In another aspect, a warewash machine liquid dispening arm includes a nozzle removably positioned in a nozzle opening of the liquid dispensing arm. The nozzle is configured to output liquid in a specific output pattern. The nozzle receiving opening and the nozzle are cooperatively shaped and configured such that when the nozzle is inserted in the nozzle receiving opening the nozzle is automatically positioned such that an orientation of the specific output pattern relative to an arm axis is automatically set to a specific orientation.

In another aspect, a warewash machine arm for ejecting liquid in a warewash machine includes an arm body defining an internal liquid space along an arm axis and a liquid outlet in a surface of the arm. A nozzle is configured to output liquid in a specific pattern with the nozzle removably connected with the arm body to receive liquid from the liquid outlet. The nozzle is removably connected to the arm body in a manner such that a position of the nozzle relative the arm is automatically set to a position in which an orientation of the specific pattern relative to the axis of the arm is automatically set to a specific orientation.

DETAILED DESCRIPTION

Figure 1:
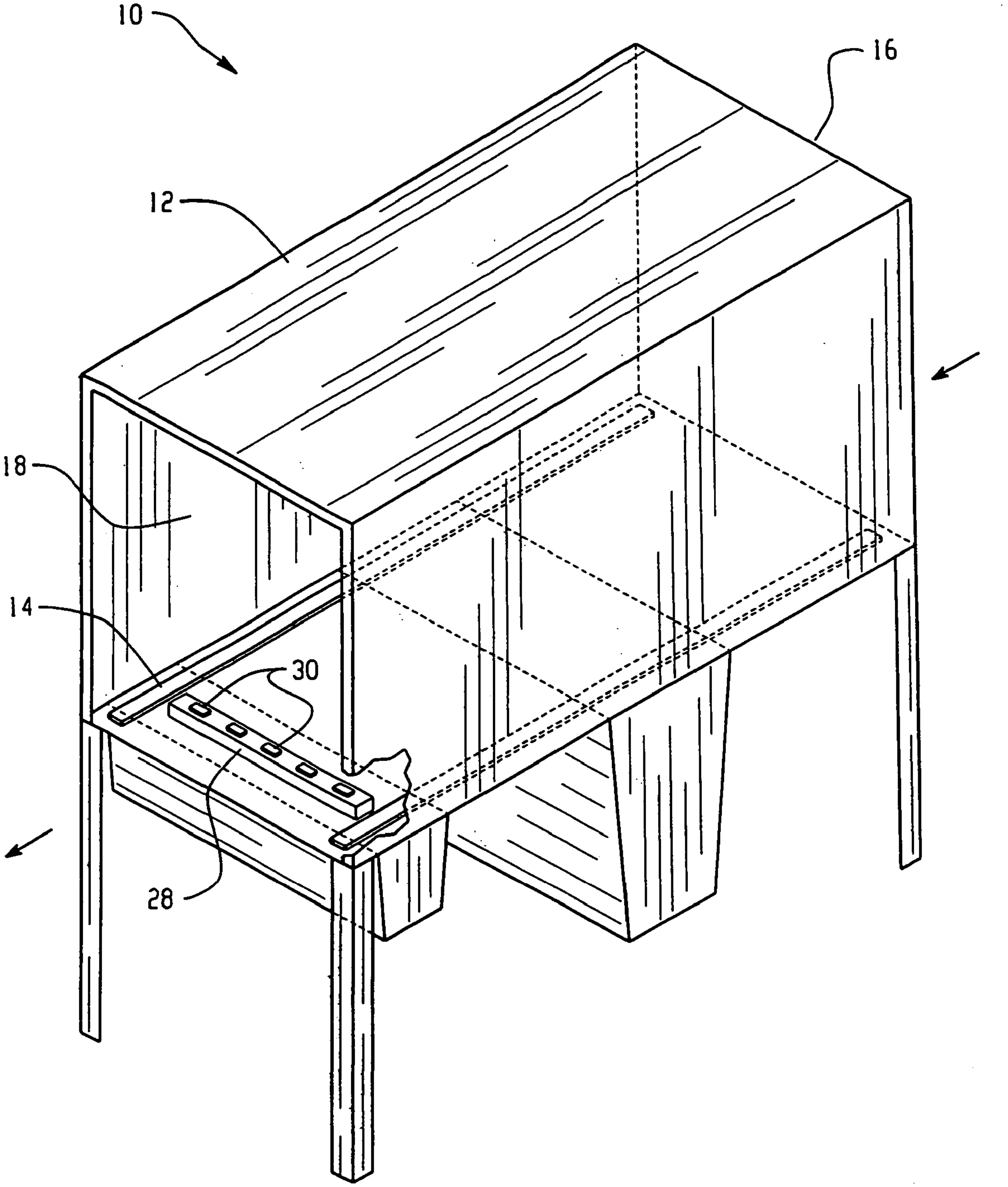
FIG. 1 is a perspective view of one embodiment of a conveyor-type unit.
Figure 2:
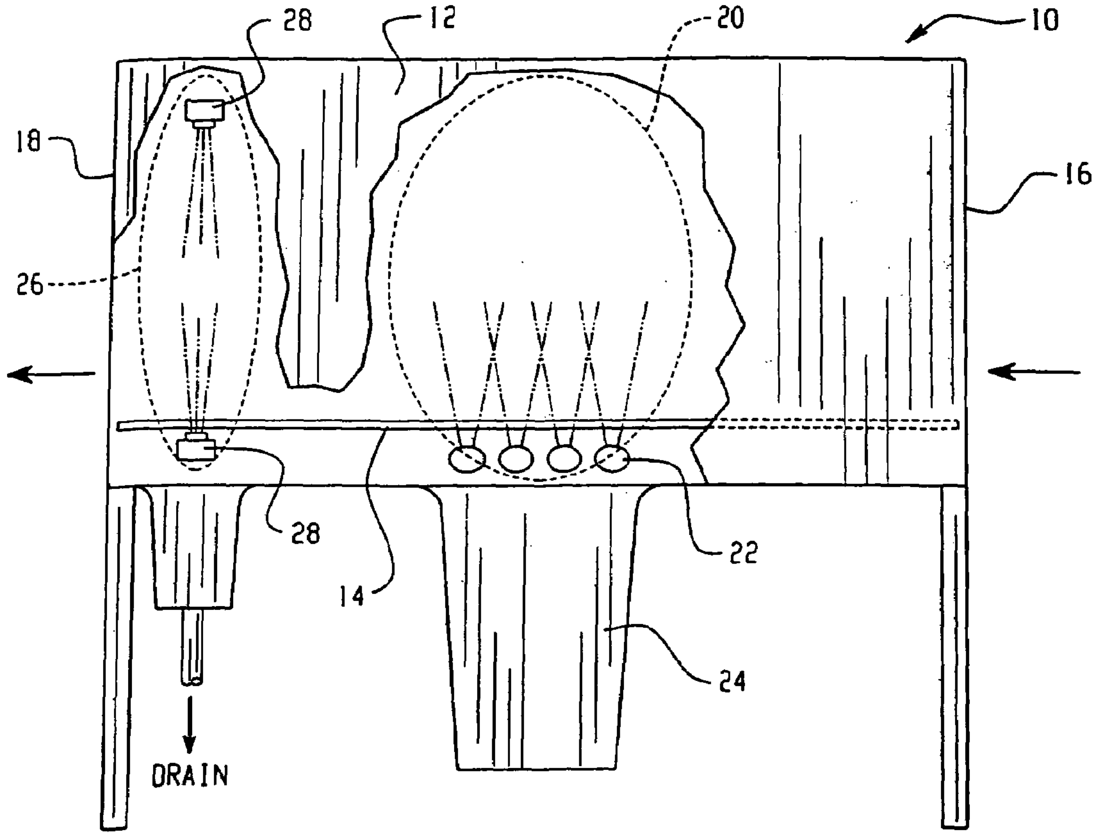
FIG. 2 is a side elevation of the unit of FIG. 1.

Referring to FIGS. 1 and 2, a conveyor-type unit 10 includes a housing 12 with a conveyor 14 extending therethrough. The conveyor 14 may be formed by spaced apart belts or a dog-type system as described in U.S. Pat. No. 6,559,607. Other types of conveyor systems could also be used, including conveyors pre-formed with structures for receiving and supporting individual wares. Whatever the construction of the conveyor, the region generally above the conveyor represents a ware receiving area within the housing 12.

The unit 10 includes an entry side 16 and an exit side 18. A wash section 20 within the housing includes one or more wash arms 22 for directing wash liquid or other wash media onto wares traveling along the conveyor 14. The wash liquid may be recirculated by a suitable pump through a wash liquid tank 24 located beneath the wash section to receive the wash liquid as it falls from the wares. The tank 24 may typically include an overflow drain as well as a manual or automatic drain mechanism to enable draining of the entire tank 24. In the illustrated embodiment the wash arms 22 are located beneath the conveyor 14 to direct wash liquid upward onto the wares. Other locations for the wash arms 22 are possible, including toward the top of the housing and on the sides of the housing. A rinse section 26 located downstream of the wash section 20 includes rinse arms 28 that direct rinse liquid onto wares traveling along the conveyor 14. In the illustrated embodiment, an upper rinse arm directs rinse liquid downward onto the wares and a lower rinse arm directs rinse liquid upward onto the wares. Other locations for the rinse arms are possible, such as toward the sides of the housing.

Figure 3:
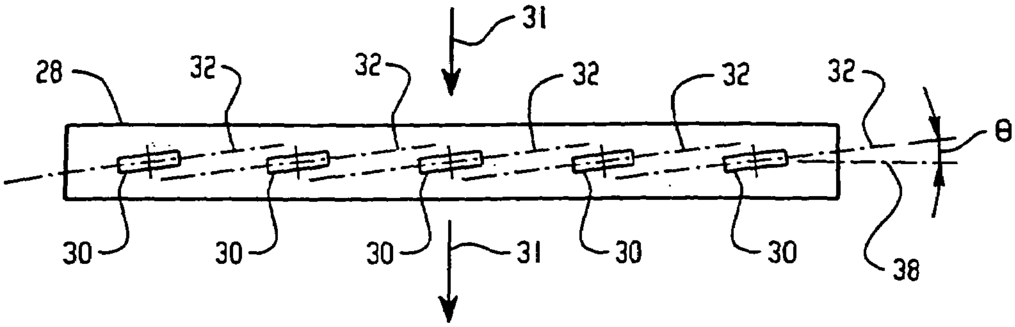
FIGS. 3 and 4 shows one embodiment of a rinse arm.

Referring now to the exemplary rinse arm 28 shown in FIG. 3, the arm includes a plurality of fluidic oscillator nozzles 30 positioned thereon for outputting respective streams of rinse liquid. As will be described in greater detail below, the fluidic oscillator nozzle 30 and arm 28 include connecting structure such that, when connected to the arm, the fluidic oscillator nozzle outputs a desired oscillating fluid stream pattern relative to the ware receiving area. The connecting structure can allow the fluidic oscillator nozzle 30 to be connected to the arm 28 in either one of two, pre-selected orientations with the fluidic oscillator nozzle providing the same desired oscillating stream pattern in each of the orientations.

Figure 4:
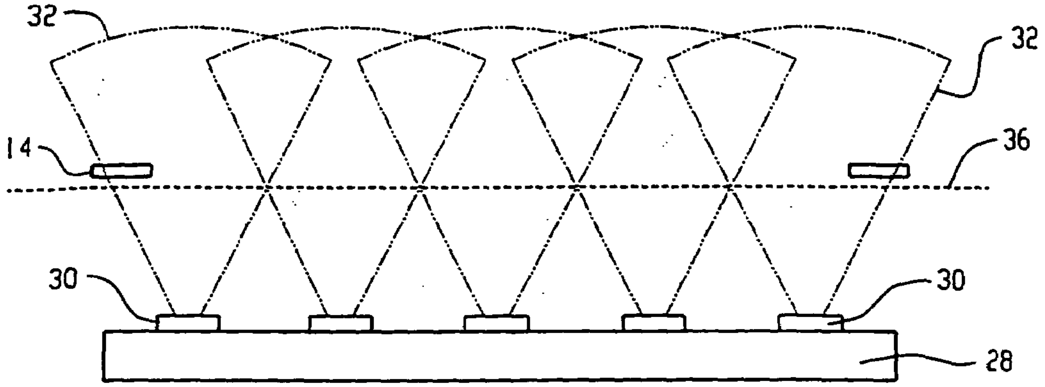

A fluidic oscillator nozzle is generally any nozzle that outputs an oscillating stream of fluid, meaning that the direction of the output stream of fluid varies in an oscillatory manner. In the case of liquids, the stream of liquid is typically made up of a series of drops of the liquid being output. The resulting fan-shape 32 covered by the sweep of the output stream of each nozzle is best seen in FIG. 4, with the output stream 34 at a given moment in time reflected in FIG. 5. Arrows A1-A5 reflect the instantaneous direction of different points or drops (P1-P5) of the stream output by the port at respectively different times, A1 representing instantaneous direction for point or drop P1 of the stream output at an earliest point in time, A2 representing instantaneous direction for point or drop P2 output at a later time and so on. The illustrated arm 28 includes five nozzles 30, but the number could vary considerably. In one example the lower rinse arm 28 includes six nozzles 30 and the upper rinse arm includes five nozzles. The illustrated rinse arm has an axis that extends substantially perpendicular to the direction of the conveyor, but it is recognized that variations on this orientation are possible.

In the illustrated embodiment, the rinse arm 28 extends in a direction across a conveying direction (arrows 31 of FIG. 3 and into or out of the page in FIG. 4) of the ware conveyor 14 and the fluidic oscillator nozzles 30 are located to assure that rinse liquid covers an entire lateral area of the conveyor. In particular, where the rinse arm is a lower rinse arm, the fan-shaped lateral coverage of the streams overlaps at a location/height 36 that is just below the level of the conveyor 14. Further, in the illustrated embodiment each of the plurality of fluidic oscillator nozzles 30 is oriented to prevent its output oscillating stream from interfering with oscillating streams output by adjacent fluidic oscillator nozzles. In one example this result is achieved by orienting each nozzle 30 to output its oscillating stream such that oscillating movement of ejected liquid occurs at an angle θ relative to a longitudinal axis 38 of the rinse arm 28. In other words, the sweep of the nozzles is skewed to prevent the interference while still assuring complete coverage across the width of the conveyor. In one example, the angle θ may be in the range of about two to ten degrees, but variations are possible, including angles from zero to ninety degrees. Further, it is recognized that constructions in which the angle of each nozzle is different and/or in which adjacent fluid streams interfere with each other are possible.

Fanjet nozzles output water in a spread pattern, with drops simultaneously output in multiple directions within the spread, rather than outputting a stream of drops with changing instantaneous direction as fluidic oscillator nozzles do. Fluidic oscillator nozzles can provide an advantage of larger output drop size (in the case of liquids) for a given flow rate than commonly used fanjet nozzles having the same flow rate, providing better washing or rinsing and also reducing heat loss to the air. In one example, fluidic oscillators outputs rinse liquid with an average drop size at least twenty-five percent greater than that output by a typical fanjet nozzle having the same flow rate. It is contemplated that the nozzles will typically be fed by a relatively constant pressure fluid, but a pulsing output from the nozzles could be produced, as by using a liquid manifold having an associated variable pressure mechanism to vary the pressure within the liquid manifold in a pulsed manner.

One embodiment of a fluidic oscillator nozzle 30 of the rinse arm 28 is shown in FIGS. 6-10. The nozzle 30 includes a first nozzle side part 50A, a second nozzle side part 50B constructed separate from the first nozzle side part 50A and connected to the first nozzle side part to form a functioning, complete fluidic oscillator nozzle 30, wherein the first nozzle side part 50A and second nozzle side part 50B are identical in shape and configuration. Each nozzle side part may be of unitary, molded plastic construction, with a Polyvinylidene Fluoride (PVDF) homopolymer representing one acceptable material. It is also recognized that other plastics could be used, or the nozzle could be constructed of other materials including, by way of example, metallic materials or ceramics. Further, rather than being molded, other construction techniques for the nozzle side parts could be used including, by way of example, machining, etching, forming and EDM.

The nozzle side parts 50A and 50B have respective internal sides 52A and 52B and respective external sides 54A and 54B. The internal sides have identical protrusions (e.g., curved ridge 56, curved ridge 58 and post 60) and identical recesses (e.g., curved recess 62, curved recess 64 and post receiving aperture 66). In final construction, the first nozzle side part 50 is arranged in mirror image orientation relative to and adjacent the second nozzle side part 52 such that the protrusions of the first nozzle side part frictionally engage into the recesses of the second nozzle side part and the protrusions of the second nozzle side part frictionally engage into the recesses of the first nozzle side part. Such engagement aids in holding the side parts together and also performs a sealing function for the cavity formed internal of the nozzle 30.

Both the first nozzle side part 50 and the second nozzle side part 52 include at least one exterior mating finger (e.g., flexible fingers 70A, 70B and rigid fingers 72A, 72B) and at least one exterior mating opening (e.g., fixed openings 74A, 74B and movable openings 76A, 76B). In final construction the first nozzle side part 50 is arranged in mirror image orientation relative to and adjacent the second nozzle side part 52 such that the exterior mating finger(s) of the first nozzle side part engage the exterior mating opening(s) of the second nozzle side part and the exterior mating finger(s) of the second nozzle side part engages the exterior mating opening(s) of the first nozzle side part.

Figure 11:
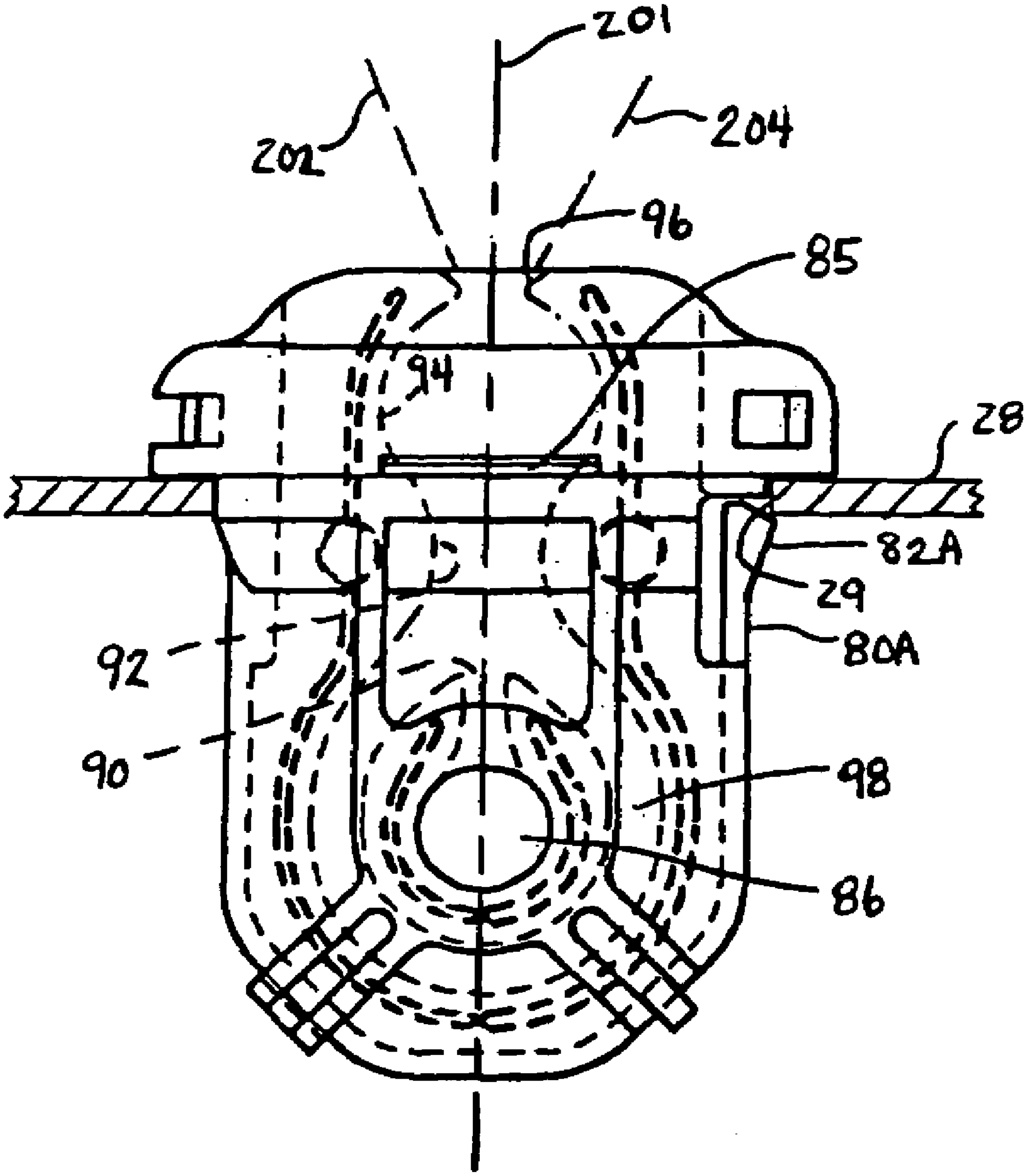

Referring to FIG. 11, the nozzle 30 has a shape that cooperates with opening 29 to allow the nozzle to be connected to the arm 28 in two orientations using a stop-and-go-type relationship to automatically position the nozzle in an orientation that allows the nozzle to connect to the arm. By "stop-and-go relationship" it is meant that in certain orientations of the nozzle relative to the opening, the shape of the nozzle and the opening allow the nozzle to be inserted through the opening as necessary to establish a connection and in other orientations of the nozzle relative to the opening, the shape of the nozzle and opening prevent the nozzle from passing through the opening as necessary to establish a connection until the orientation of the nozzle relative to the opening is adjusted to one of the formerly-described orientations.

Figure 10:
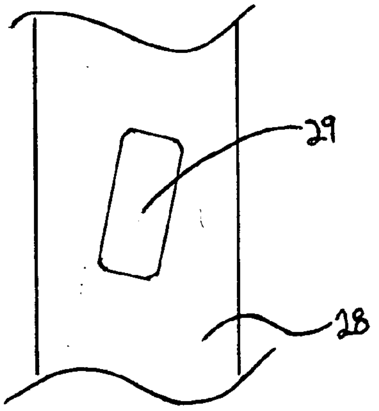
FIG. 10 illustrates a top view of the rinse arm of FIG. 9 with the fluidic oscillator nozzle removed showing the nozzle receiving opening.
Figure 9:
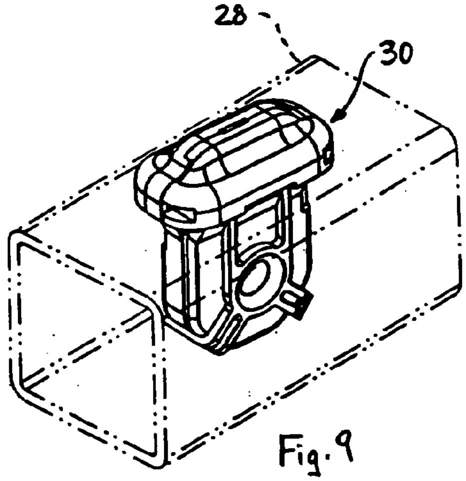

As shown by FIG. 11, the illustrated nozzle 30 can be connected to the arm 28 in only two orientations, a first orientation, which is shown, and a second orientation where the nozzle is rotated about 180 degrees about axis 201 and then inserted into the opening 29. The number of orientations is limited in this embodiment, in part, due to the elongated, symmetric shape of the nozzle 30 and the corresponding elongated shape of the opening 29 (FIG. 10). In both the first and second orientations, the enlarged head portion of the nozzle is capable of seating against the top surface of the arm 28, and the orientation of the fan-shaped output pattern of each nozzle relative to the wash area is set to the same, specific, desired orientation. Other configurations are possible depending on the contour of the nozzle and shape of the opening of the wash arm. As mentioned above, in any of the two orientations where the nozzle 30 is inserted through the opening 29 and is connected to the arm 28 with its enlarged head adjacent the surface of the arm, the nozzle will output a specific pattern relative to the wash area, e.g., as described herein, at the same, specific orientation automatically set by the orientation of the nozzle. Embodiments in which the nozzle only fits into the nozzle opening in a single orientation are also contemplated. For example, one such embodiment might could be where the nozzle opening is non-symmetric and the nozzle body is correspondingly shaped to the non-symmetric opening.

The nozzle may also include at least two flexible fingers 80A and 80B to facilitate snap-fit insertion of the nozzle into an appropriately sized and shaped opening 29 of the rinse arm, such fingers including respective surfaces 82A, 82B ramped to engage an opening during insertion to flex the fingers to an insertion position (e.g., inward toward the nozzle body), and the fingers returning to a holding position after insertion. The protruding part of the nozzle 30 includes a notch 85 to receive a tool (such as a screwdriver) to enable removal of the nozzle from the opening as by a prying operation. In one example, the protruding part of the nozzle may protrude no more than about 0.4 inches in order to reduce the potential for nozzle breakage, but variations on this distance are possible. In alternative embodiments, the nozzle may include exterior threads to facilitated engagement with the opening in the opening 29. In the case of metal nozzles, they could be welded to the rinse arm or other manifold. The use of fasteners is also contemplated.

While the foregoing nozzle description primarily contemplates a nozzle in which the identical side parts are snap-fit together, it is recognized that other connection techniques could be used. For example, connection by one of an adhesive, one or more fasteners, a welding operation, such as ultrasonic welding for plastics, or a brazing operation (for metals) might be used. Further, while the foregoing nozzle description primarily contemplates first and second nozzle side parts constructed separately, they could be constructed together (e.g., as in a clamshell-type configuration including a connecting hinge could be provided between a single molded plastic piece including the two side parts, enabling the side parts to be folded against each other and connected together, as by any suitable technique previously mentioned, to form the internal cavity of the nozzle). Still further, a one piece nozzle construction could also be used. For example, an investment cast one-piece nozzle could be used.

Figure 5:
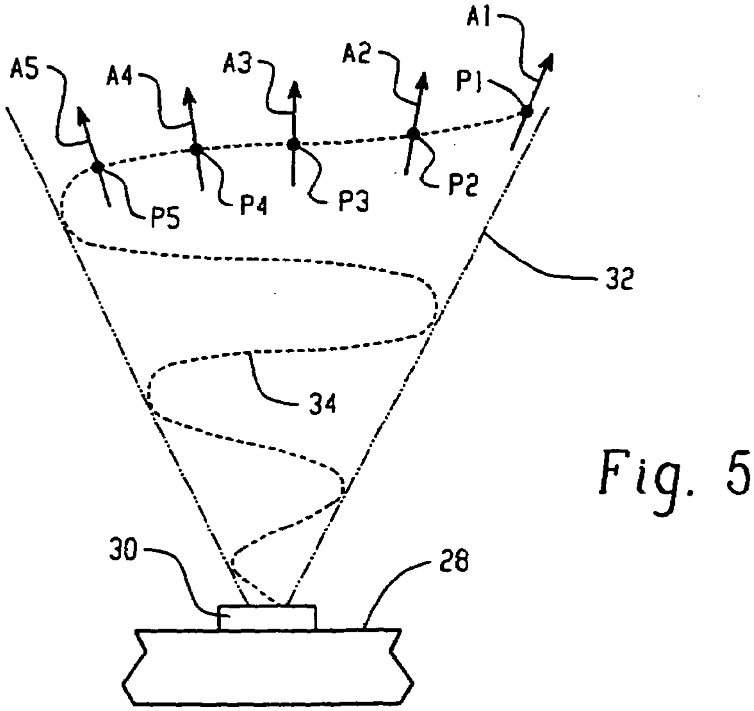
FIG. 5 depicts an oscillating output stream of a fluidic oscillator nozzle.
Figure 8:
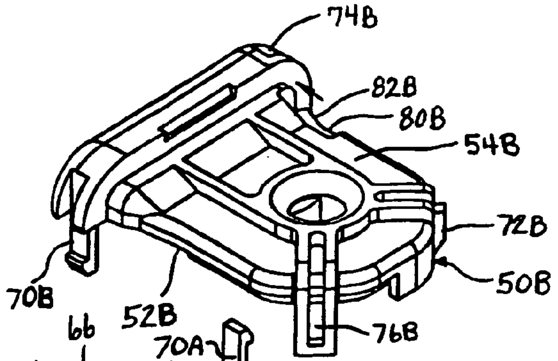
FIGS. 6-9 and 11 illustrate one embodiment of a fluidic oscillator nozzle.
Figure 7:
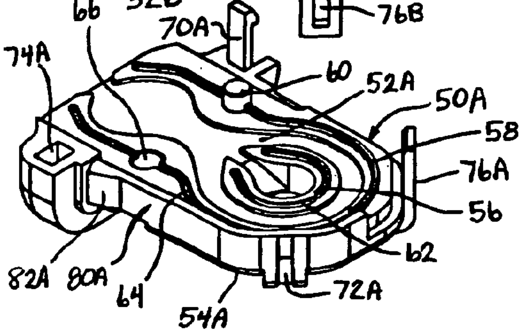
Figure 6:
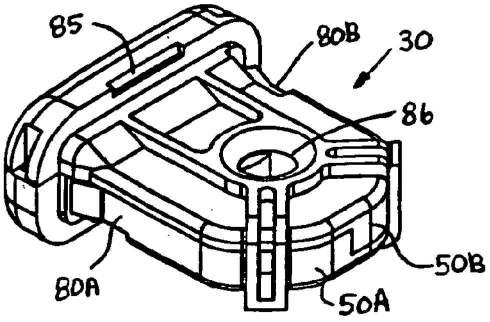

Referring still to FIG. 11, a description of the internal cavity of the illustrated nozzle is provided. The nozzle includes openings 86 on opposite sides (e.g., each side part is formed with an opening that will lead to the internal cavity when the side parts are connected). In particular, the openings lead to an orifice 90. The size of the orifice 90 in combination with the pressure of the fluid delivered thereto controls the flow rate of the nozzle 30. The fluid stream exiting the orifice 90 is directed towards a throat 92 that opens to a body portion 94 having an associated exit port 96 through which the fluid stream is output from the nozzle 30. A feedback loop 98 located adjacent the orifice 90 provides a changing pressure differential to vary the direction of the output fluid stream in an oscillating manner. In particular, the fluid stream output from the orifice 90 tends to attach to one sidewall of the throat 92 and as a result of the "Coanda Effect" follows that wall through the body portion 94. When the fluid stream attaches to one sidewall it tends to create a low pressure condition on the same side of the feedback loop 98 due to the high speed flow near that side of the feedback loop 98. As a result, fluid is drawn around the feedback loop toward the low pressure region and toggles the fluid stream exiting the orifice 90 toward the opposite sidewall of the throat 92. These conditions repeat and the fluid stream exiting the orifice 90 repeatedly moves back and forth attaching to the two opposed sidewalls and thus oscillating its direction when output from the port 96 as best seen in FIG. 5. The angular orientation or instantaneous direction of the output stream with respect to the axis 201 of the nozzle varies over time. In particular, in the illustrated embodiment the output stream oscillates back and forth relative to a plane extending in and out of the page in FIG. 10, where the illustrated nozzle axis 201 lies in the plane. The two extremes of oscillation are represented at 202 and 204. For ease of reference the illustrated nozzle axis 201 is defined by a line passing though the center point of the nozzle port 96 and the center point of the orifice 90. However, the angular orientation or instantaneous direction of the output stream can be said to vary relative to any nozzle axis defined by a line passing through any two spaced apart points on the nozzle, where the relative position between the two spaced apart points does not change.

Varying degrees of oscillation can be achieved by modifying the nozzle configuration. Oscillating frequency is also affected by fluid pressure and medium (e.g., gas or liquid). Further, the shape and orientation of the feedback loop provided within the nozzle could vary significantly.

It is recognized that the foregoing nozzle construction is one of many possible fluidic oscillator nozzle constructions that could be used. Further, while the typical fluidic oscillator nozzle construction provides an output stream that, more or less, moves back and forth in two-dimensions along a plane, it is contemplated that other fluidic oscillator nozzle constructions could be used where the oscillation occurs in three dimensions. Further, it is also recognized that nozzle constructions in which the output stream technically does not "oscillate" are possible, such as an output stream that moves in one direction to produce a helical or cylindrical output, an expanding helical or cone-shaped output or an output stream having an orientation that varies randomly/chaotically relative to the axis of the nozzle. As used herein the terminology "variable stream orientation nozzle" is intended to encompass any and all such nozzle constructions that output a stream of fluid with an instantaneous direction that varies over time relative to a nozzle axis, regardless of whether the variance is regular, random, oscillating or non-oscillating.

The wash arms 22 could also include fluidic oscillator nozzles or other variable stream orientation nozzles positioned therein to direct wash fluid onto the wares. It is generally contemplated that the wash arm nozzles would be constructed to produce a higher flow rate than the rinse arm nozzles, but variations are possible, including the use of identical nozzles for both rinse and wash.

While the foregoing embodiment of the conveyor-type ware wash machine contemplates a single wash section 20 and a single rinse section 26, it is recognized that conveyor-type machines having multiple wash sections and/or multiple rinse sections could be provided. It is further contemplated that other sections could be provided within the machine, such as an upstream pre-wash section using one or more variable stream orientation nozzles to output a pre-wash liquid to remove larger food materials from wares or to output steam, a downstream sanitizing section using one or more variable stream orientation nozzles to output a sanitizing liquid, a downstream drying section using one or more variable stream orientation nozzles to output air (heated or unheated) or some other gas for drying, or a downstream heating section in which heated air or steam is output by one or more variable stream orientation nozzles to heat the wares for sanitizing purposes.

Moreover, use of fluidic oscillator nozzles in under-counter and other box units is also contemplated. For example, referring to FIGS. 12 and 13, an exemplary under-counter unit is shown and includes a washing/rinsing chamber 100 that is defined by a cabinet, housing usually formed of stainless steel panels and components, and including a top wall 110, side walls 120 and rear wall 140, and a front facing door 150, hinged at its lower end, as indicated at 160. The chamber 100 is vented to ambient pressure through labyrinth seals (not shown) near the top wall. The cabinet is supported upon legs 170 which provide the clearance for the underside of the machine to permit cleaning beneath it as may be required by various local sanitation codes. At the bottom of the chamber, as part of the sloping bottom wall 200 of the cabinet, is a relatively small sump 220 that may have a removable strainer cover 230.

Above the bottom wall, rails 240 provide support for standard ware racks 250, loaded with ware to be washed and sanitized, which are loaded and unloaded through the front door. The rack 250 may be a rolling rack intended to remain with the unit or may be a mobile rack intended to be removed entirely when the wares are removed. A coaxial fitting 270 is supported on the lower wall 200, centrally of the chamber, and this fitting in turn provides support for a lower wash arm 300 and lower rinse arm 320, each being rotational as is common. An upper wash arm 340 and upper rinse spray heads 360 are supported from the top wall of the chamber. The wash arms 300 and 340 may include suitable fluidic oscillator nozzles 302 (or other variable stream orientation nozzles) incorporated therein (e.g., as in the manner previously described with respect to FIG. 9 or any other suitable manner). Likewise rinse arm 320 may include suitable fluidic oscillator nozzles 322 (or other variable stream orientation nozzles), and the spray heads 360 may include suitable fluidic oscillator nozzles (or other variable stream orientation nozzles).

The fresh hot rinse water supply line 400 extends from a source of hot water and is connected to the rinse arm 320 and rinse spray heads 360. The wash water supply line 420 is connected to the upper and lower wash arms 340 and 300, and receives wash water from a pump 450 mounted to one side of and exterior of the cabinet. The pump in turn is supplied from an outlet pipe 470 that extends from sump 220 and returns or recirculates the wash water sprayed over the ware in the rack during the wash segment of the machine cycle. Thus, during the wash portion of an operating cycle, pump 450 functions as a recirculating pump means.

A solenoid operated drain valve 480 is connected by a branch or drain pipe 490 to the wash water supply line 420 immediately downstream of the outlet of pump 450, and this valve when open allows flow of the pump discharge to a drain line 500 that may be connected into a suitable kitchen drain system 520, according to the applicable code regulations. In many kitchens in newer fast food restaurants the drain system may be considerably above the floor, thus the pumped discharge from the dishwasher is a desired feature in those installations. Also, when the drain valve is open, the path of least resistance to the pump output is through drain valve 480, and flow through the recirculating wash plumbing quickly diminishes due to back pressure created at the nozzles of the wash arms. At this time the pump 450 functions as a drain pump means. During the normal cycle of operations of this machine, drain valve 480 is opened once each cycle of operation, after the wash segment and before the rinse segment of the cycle.

A solenoid-operated fill valve 550 is connected, in the embodiment shown, to control the supply of fresh water to a booster heater tank 580, which is a displacement type heater tank having its inlet connected to receive water through fill valve 550, and its outlet connected to the fresh rinse water supply line 400. The booster heater has a heating element 700 and has the usual pressure relief valve 590 which will divert hot water through an overflow pipe in the event the tank pressure exceeds a predetermined value. While the illustrated booster heater tank 580 and pump 450 are shown alongside the main dishwasher housing, it is recognized that embodiments in which the pump 450 and booster are provided internal to the main housing, such as beneath the wash chamber, are within the contemplated scope of the various inventions described herein. An atmospheric style booster could also be used.

Also, a low capacity (e.g. 500 W) heater 720 may be located in or on the sump 220. Such a heater may be, for example, a wire or similar heating strip embodied in an elastomeric pad that can be adhered to the exterior of the sump to heat water in the machine by conduction, if necessary. The heater 720 may alternatively be provided internally.

Figure 12:
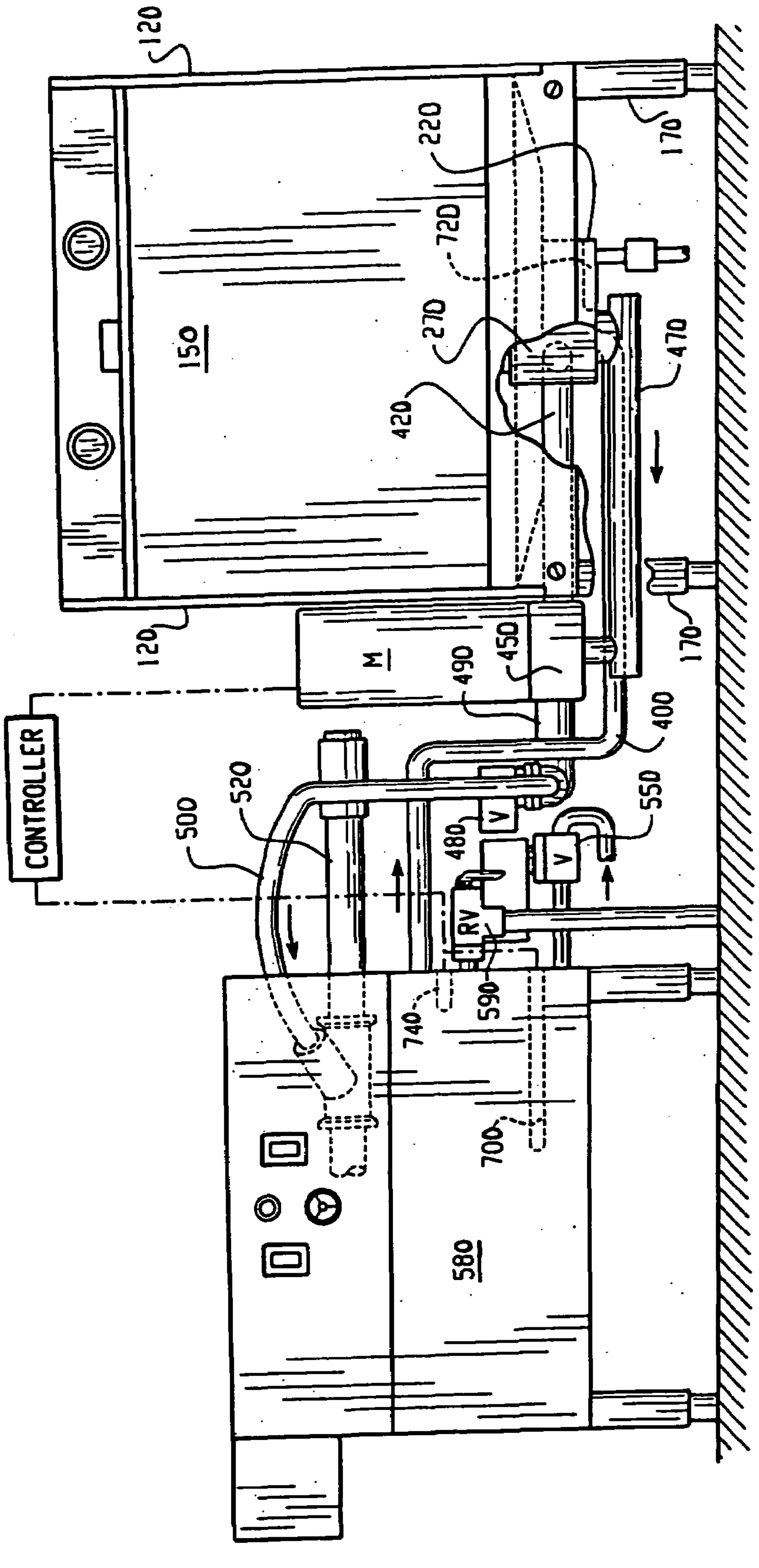
FIGS. 12-13 illustrate one embodiment of an undercounter ware wash box-type unit.
Figure 13:
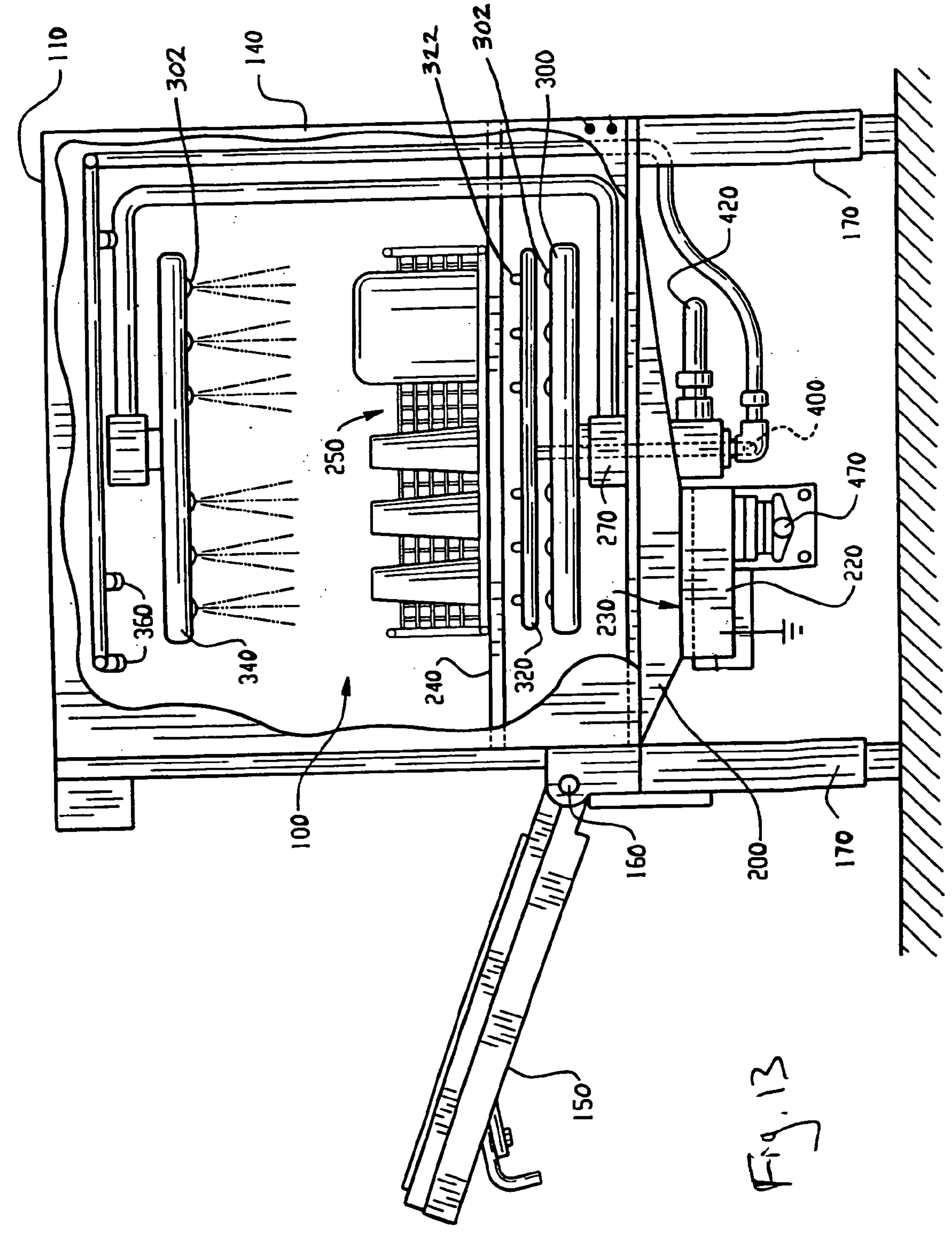

The undercounter unit of FIGS. 12 and 13 could also incorporate one or more variable stream orientation nozzles that output a gaseous fluid, such as air (heated or unheated) or steam, and it is recognized that numerous variations on undercounter units or other box units are possible.

Figure 14:
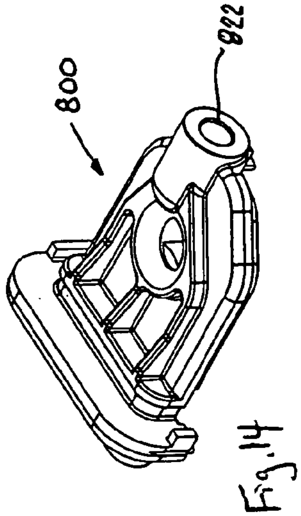
FIGS. 14-18 illustrate another embodiment of a fluidic oscillator nozzle.
Figure 15:
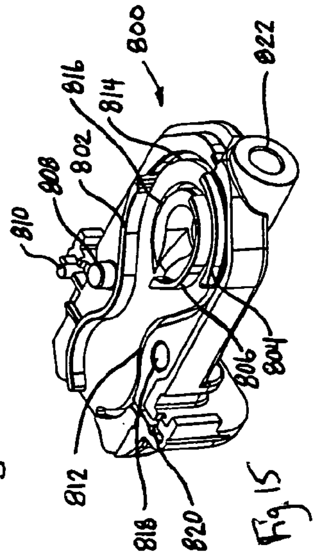

Referring now to FIGS. 14-18, an alternative embodiment of a fluidic oscillator nozzle and its installation in a rinse or wash arm is shown. FIGS. 14 and 15 represent identical nozzle halves 800 oriented on the page in a manner that permits them to be fitted together to form a functional nozzle. The internal side of each nozzle half 800 includes protrusions (e.g., curved protrusions 802, 804 and 806, and posts 808 and 810) that mate with corresponding recesses (e.g., curved recesses 812, 814 and 816 and cylindrical openings 818 and 820) on the other nozzle half in a friction fit manner to aid in holding the two nozzle halves together in assembled form. An ultrasonic welding process, solvent welding process or heat and pressure welding process may also be used to more permanently connect the nozzle halves together. Screws or other fasteners could also be used in addition to or in place of the welding and/or friction fit. Each nozzle half 800 also includes a boss 822, which can be used for connecting the nozzle in a wash or rinse arm as described in further detail below. Notably, the orifice, throat, body portion, output port and feedback loop of the nozzle created by combined nozzle halves 800 are all primarily defined by the curved protrusions 802, 804 and 806.

Figure 16:
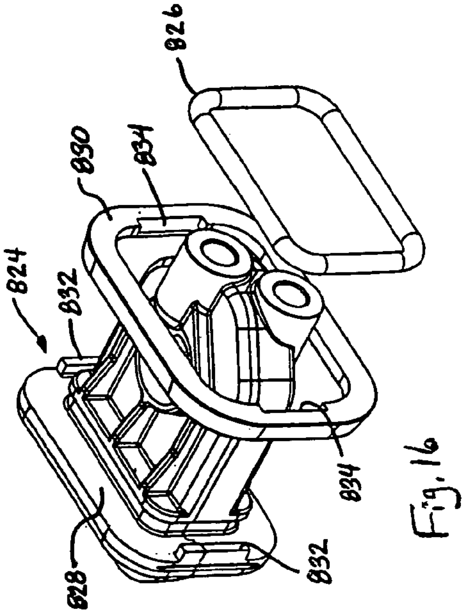
Figure 17:
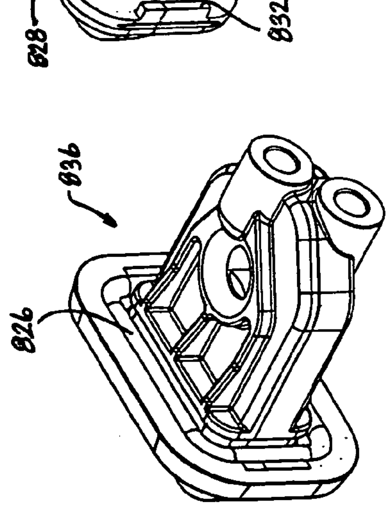

As shown in FIG. 16, nozzle halves 800 combine to form a functional nozzle 824. A gasket/seal 826 may be provided for location against surface 828 of the nozzle, with gasket housing 830 provided to limit the outward movement of the gasket 826. Protrusions 832 of the nozzle 824 are sized for frictionally fitting in recesses 834 of the gasket housing 830 to hold the components together in the nozzle assembly form 836 shown in FIG. 17.

Figure 18:
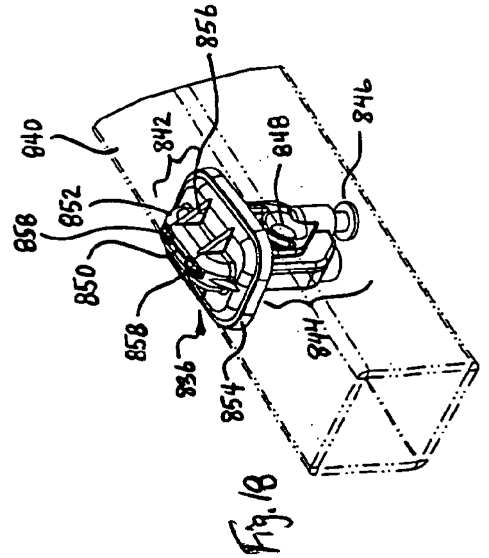

Nozzle assembly 836 is shown mounted in exemplary wash or rinse arm 840 in FIG. 18, with portion 842 of the assembly protruding from the arm 840 and with portion 844 internal to the arm 840. A screw 846 is positioned through an opening in the bottom of the arm and threaded into boss 822 to secure the nozzle assembly 836, with the screw tightened sufficiently to cause the gasket 826 to form a seal against the top of the arm 840. Fluid under pressure within the arm 840 flows into inlet opening 848 of the nozzle and is ejected from exit port or orifice 850 in an oscillating manner as previously described. Notably, exit port 850 is located near the top of an upwardly projecting nozzle head 852 of the nozzle assembly, where nozzle head 852 is surrounded by a mounting flange 854 having an underside adjacent the top surface of arm 840. Ribs 856, which may be molded with the nozzle, are disposed at multiple locations around the nozzle head 852 and provide increased stiffness to aid in keeping the nozzle head from breaking or bending if impacted by wares or anything else within the ware wash machine. The ribs can also aid in keeping the nozzle part flat during molding and when the nozzle halves 800 are welded together. Nozzle port guards 858, illustrated in the form of projecting bumps, are disposed on opposite sides of the nozzle port 850. The port guards 858 project above the nozzle port 850 so that the port guards 858 are in position to be impacted before the nozzle port 850. In the event the arm 840 is removed from a warewash machine for cleaning, it is possible that the arm 840 could be subjected to impacts, such as an operator banging the arm against a sink or other structure. In such cases the nozzle guards 858 should take the brunt of any impact instead of the nozzle port 850, thereby preventing or limiting damage/deformation of the nozzle port 850, which could adversely affect the spray pattern of the nozzle.

It is to be clearly understood that the above description is intended by way of illustration and example only and is not intended to be taken by way of limitation. For example, while the nozzles are primarily described in association with manifolds in the form of stationary or rotating wash arms and/or rinse arms, it is recognized that other manifold types could be used, such as an oscillating arm or the wall of a wash chamber housing where the area behind the wall constitutes a manifold and nozzles are fixed in openings of the wall. Further, a manifold is not required, as each nozzle could be supplied with its fluid (liquid or gas) by an individual line not associated with any manifold. While it is contemplated that the delivery of any one fluid (e.g., any one of a rinse liquid, wash liquid or drying gas) will most often utilize multiple nozzles, it is possible that a machine could use a single nozzle to deliver a given fluid, or that the same nozzle or nozzles could be used to deliver multiple different fluids during different stages of a ware wash operation. Further, while the primary embodiments and examples described above contemplate nozzles that are fixed relative to some type of manifold, it is recognized that the nozzles could move relative to the structure to which they are mounted. Further, the terms “rinse liquid” and “wash liquid” are to be construed broadly, as each could be comprised of heated or unheated water, any heated or unheated water solution (e.g., water plus detergent as a wash liquid or water plus a rinse agent or/sanitizing agent as a rinse liquid), or in some cases non-aqueous liquids. Moreover, while the nozzle orienting feature described herein focuses on fluidic oscillator nozzles, such a feature could be provided for other types of removable nozzles, including the common fanjet type nozzle. Other changes and modifications could be made.

What is claimed is:

1. A ware wash machine comprising:

a housing including an area for receiving wares to be washed;

a liquid dispensing arm removably positioned within the housing, the liquid dispensing arm including a nozzle receiving opening having a non-circular perimeter; and a nozzle removably positioned in the nozzle opening, the nozzle including a nozzle body having a non-circular perimeter and a fluid passageway extending through the nozzle body to a nozzle outlet, the nozzle outlet configured to output liquid in a specific output pattern;

wherein the non-circular perimeter of the nozzle receiving opening and the non-circular perimeter of the nozzle body are cooperatively shaped and configured such that when the nozzle body is inserted in the nozzle receiving opening, the non-circular perimeter of the nozzle body and the non-circular perimeter of the nozzle receiving opening cooperate to align the nozzle so that the nozzle is automatically positioned such that an orientation of the specific output pattern relative to the area is automatically set to a specific orientation.

2. The warewash machine of claim 1, wherein the nozzle is a fluidic oscillator nozzle.

3. The warewash machine of claim 1, wherein the nozzle receiving opening is elongated.

4. The warewash machine of claim 1, wherein the nozzle fits within the nozzle receiving opening in either a first inserted orientation or a second inserted orientation, the second inserted orientation being rotated about 180 degrees relative to the first inserted orientation, in both the first orientation and second orientation the specific output pattern of the nozzle is set to the specific orientation.

5. The warewash machine of claim 1, wherein the nozzle snap fits into the nozzle receiving opening.

6. The warewash machine of claim 1, wherein the nozzle is removably held within the nozzle receiving opening by a threaded fastener passing upward through the liquid dispensing arm and toward the nozzle receiving opening.

7. The warewash machine of claim 1, wherein the nozzle body and the nozzle receiving opening are shaped and configured to form a stop-and-go relationship.

8. A warewash machine liquid dispensing arm, comprising:

a nozzle including a nozzle body an enlarged head portion extending outwardly from the nozzle body, the nozzle body being removably positioned in a nozzle opening extending through an external surface of the liquid dispensing arm, the head portion having a dimension that is larger than the nozzle opening to seat against the external surface of the liquid dispensing arm, the nozzle configured to output liquid in a specific output pattern;

wherein the nozzle receiving opening and the nozzle body are cooperatively shaped and configured such that when the nozzle is inserted in the nozzle receiving opening the nozzle is automatically positioned such that an orientation of the specific output pattern relative to an axis of the arm is automatically set to a specific orientation;

wherein the nozzle receiving opening and the nozzle body are cooperatively shaped and configured to prevent rotation of the nozzle relative to the nozzle receiving opening when the nozzle body is inserted in the nozzle receiving opening.

9. The warewash machine arm of claim 8, wherein the nozzle is a fluidic oscillator nozzle.

10. The warewash mache arm of claim 8, wherein the nozzle receiving opening is elongated.

11. The warewash machine arm of claim 8, wherein the nozzle body fits within the nozzle receiving opening in either a first inserted orientation or a second inserted orientation, the second inserted orientation being rotated about 180 degrees relative to the first inserted orientation, in both the first orientation and second orientation the specific output pattern of the nozzle is set to the specific orientation.

12. The warewash machine arm of claim 8, wherein the nozzle body snap fits info the nozzle receiving opening.

13. The warewash machine arm of claim 8, wherein the nozzle body is removably held within the nozzle receiving opening by a threaded fastener passing upward through the liquid dispensing arm and toward the nozzle receiving opening.

14. The warewash machine arm of claim 8, wherein the nozzle body and the nozzle receiving opening are shaped and configured to form a stop-and-go relationship.

15. A warewash machine arm for ejecting liquid in a warewash machine, the arm comprising:

an arm body defining an internal liquid space along an arm axis;

a nozzle configured to output liquid in a specific pattern, the nozzle removably connected with the arm body to receive liquid therefrom, the nozzle removably connected to the arm body in a manner such that a position of the nozzle relative the arm is automatically set to a position in which an orientation of the specific pattern relative to the axis of the arm is automatically set to a specific orientation;

the arm body configured to receive the nozzle within a nozzle receiving, opening, the nozzle and nozzle receiving opening being cooperatively shaped and configured to prevent insertion of the nozzle into the nozzle receiving opening to establish a fluid connection between the nozzle and the liquid outlet unless the nozzle is set to the position that will produce the specific orientation.

* * * * *

UNITED STATES PATENT AND TRADEMARK OFFICE

CERTIFICATE OF CORRECTION

PATENT NO. : 7,314,188 B2 Page 1 of 1
APPLICATION NO. : 11/005985
DATED : January 1, 2008
INVENTOR(S) : Michael Watson et al.

It is certified that error appears in the above-identified patent and that said Letters Patent is hereby corrected as shown below:

Claim 8, Col. 10, Line 55 after "nozzle body" insert --and--

Claim 10, Col. 11, Line 11 replace "mache arm" with --machine arm--

Claim 15, Col. 12, Line 18 after "receiving" delete the comma

Signed and Sealed this

Seventeenth Day of June, 2008

JON W. DUDAS
*Director of the United States Patent and Trademark Office*